United States Patent [19]

Caron

[11] 4,201,926
[45] May 6, 1980

[54] ELECTRONIC CIRCUIT FOR USE IN A VARIETY OF ENGINE CONTROL SYSTEMS

[75] Inventor: LaVerne A. Caron, Sterling Heights, Mich.

[73] Assignee: Chrysler Corporation, Highland Park, Mich.

[21] Appl. No.: 885,913

[22] Filed: Mar. 13, 1978

Related U.S. Application Data

[62] Division of Ser. No. 752,493, Dec. 20, 1976, Pat. No. 4,102,310.

[51] Int. Cl.² ................ H03K 19/08; F02P 5/08
[52] U.S. Cl. .................... 307/141; 328/141; 315/209 T; 307/10 R; 123/117 R
[58] Field of Search .......... 307/141, 269, 10; 123/117 R, 32 A; 328/63, 72, 134, 133, 141; 315/209 T, 209 M, 209 R

[56] References Cited

U.S. PATENT DOCUMENTS

| | | | |
|---|---|---|---|
| 3,756,212 | 9/1973 | Schirmer | 315/209 M |
| 3,916,855 | 11/1975 | Fauser | 123/117 R |
| 3,923,021 | 12/1975 | Stark | 123/117 R |
| 3,923,029 | 12/1975 | Polo | 123/117 R |
| 3,978,833 | 9/1976 | Crall | 123/117 R |
| 3,997,801 | 12/1976 | Caron | 123/117 R |

Primary Examiner—L. T. Hix
Assistant Examiner—S. D. Schreyer
Attorney, Agent, or Firm—Baldwin & Newston

[57] ABSTRACT

A novel electronic control circuit which may be used in different types of electronic engine control systems is disclosed. Illustrative usage in various types of electronic spark timing control systems contemplates 4, 6, and 8 cylinder engine configurations as well as single or multiple pick-ups. The circuit is intended for fabrication as an integrated circuit device to provide a low-cost unit which is advantageous in mass production usage.

9 Claims, 7 Drawing Figures

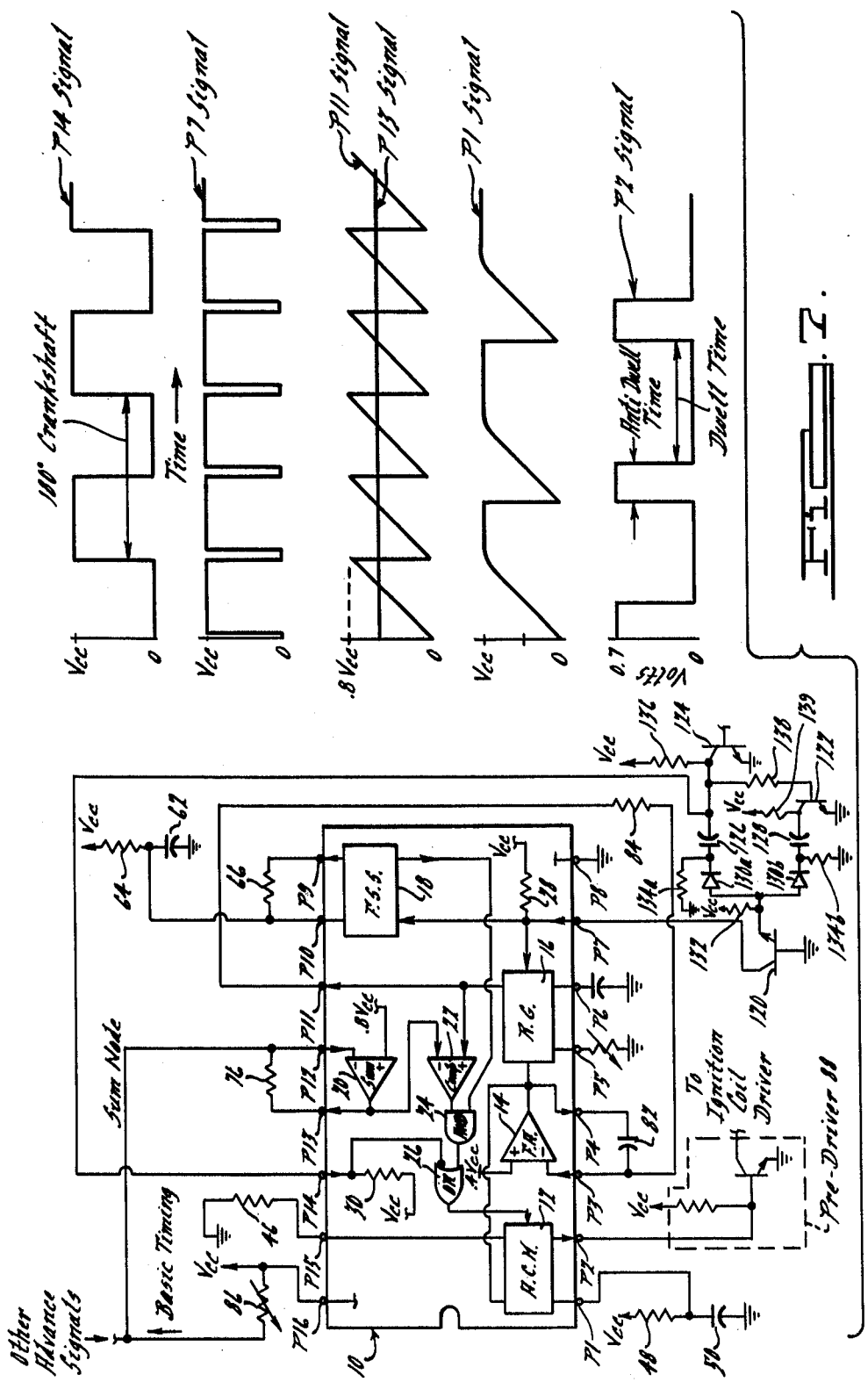

ELECTRONIC CIRCUIT FOR USE IN A VARIETY OF ENGINE CONTROL SYSTEMS

This is a division, of application Ser. No. 752,493, filed Dec. 20, 1976 now U.S. Pat. No. 4,102,310.

BACKGROUND AND SUMMARY OF THE INVENTION

This invention pertains to a novel electronic circuit which is particularly useful in an electronic control system for an internal combustion engine.

The Chrysler Electronic Lean Burn system introduced during the 1976 model year on Chrysler Corporation vehicles is a milestone in the application of electronic technology to internal combustion engines used in automotive vehicles. The Chrysler Electronic Lean Burn system has been able to achieve compliance with Federal emission standards without the use of other emission control devices such as catalytic convertors, exhaust gas recirculation (EGR), air pumps, and like devices, and in so doing, has attained a modest but significant improvement in fuel economy.

The present invention is concerned in one respect with an improvement in the Chrysler Electronic Lean Burn system. One benefit of the invention is that the number of discrete electronic circuit components is dramatically reduced. This means that economy in assembly and parts costs is realized and reliability of the system is promoted. Moreover, the circuitry may be more compactly packaged which is important where the engine controls are mounted in the limited space of the engine compartment of a vehicle. With such economy the usage of the Chrysler Electronic Lean Burn system may be expanded to encompass many engine families and vehicle lines, and this means that the Electronic Lean Burn system can be made available to a much larger number of purchasers.

In another aspect, the invention relates to a unique electronic circuit which may be used in different types of electronic engine control systems. Because of this outstanding versatility and utility, a common device embodying this unique circuit can be employed in a number of different systems; this minimizes parts inventory and stocking complexities while serving to derive the maximum benefit of mass production techniques. The circuit is particularly well suited for fabrication as an integrated circuit device using existing integrated circuit manufacturing technologies. A circuit embodying principles of the invention is especially useful in an electronic spark timing system, and its versatility permits its use in either a single or dual pick-up system and in either four, six, or eight cylinder engines.

The foregoing features, advantages, and benefits of the invention, along with additional ones, will be seen in the ensuing description and claims which should be considered in conjunction with the accompanying drawings.

BRIEF DESCRIPTION OF THE DRAWINGS

The drawings illustrate an exemplary but preferred embodiment of the present invention in several types of electronic engine control systems and disclose the best mode presently contemplated in carrying out the invention.

FIG. 7 is an electronic schematic diagram illustrating the circuit of FIG. 1 connected in a third type of electronic engine control system and includes a plurality of signal waveforms taken at selected points of the system which are useful in explaining system operation.

DESCRIPTION OF THE PREFERRED EMBODIMENTS

Figure 1:
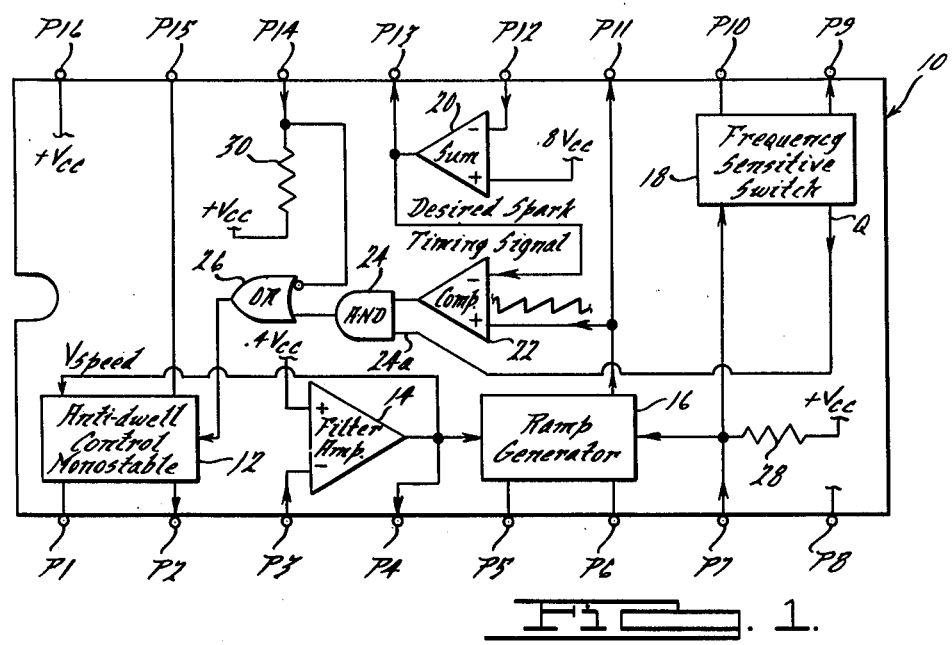
FIG. 1 is an electronic schematic diagram partly in block diagram form of a circuit embodying principles of the present invention.

FIG. 1 illustrates the novel electronic circuit 10 of the present invention. Circuit 10 is illustrated as preferably embodied in a single circuit device, for example an integrated circuit, and contains a plurality of sixteen terminals P1 through P16 inclusive via which it can be connected in an operative system. Circuit 10 comprises: an anti-dwell control monostable stage 12; a filter amplifier stage 14; a ramp generator stage 16; a frequency sensitive switch stage 18; a sum amplifier stage 20; a comparator stage 22; an "AND" logic gate 24; an "OR" logic gate 26 having one inverting input; and a pair of resistors 28 and 30. These components are arranged and organized as indicated schematically in FIG. 1. They are powered via an external power supply (not shown) which supplies a regulated DC potential across terminals P16 and P8. By way of illustration, in the example, the P8 terminal is intended to be connected to a ground potential while the P16 terminal is intended to be connected to a $+V_{cc}$ potential relative to ground, (for example $+10VDC$). The full potential and selected fractions thereof are supplied as required to selected points of the circuitry, and some of these are shown schematically in FIG. 1. For example, resistor 28 functions as a pull-up resistor for terminal P7 to the full $+V_{cc}$ supply; $0.8V_{cc}$ is supplied directly to the non-inverting input of sum stage 20; $0.4V_{cc}$ is supplied directly to the non-inverting input of filter amplifier stage 14; and resistor 30 functions as a pull-up resistor for terminal P14 to the full $+V_{cc}$ supply.

Tailoring of circuit 10 to the requirements of the different systems in which it may be used is accomplished in part by designing certain of the stages so that selected characteristics thereof may be established at least in part by external circuitry connected therewith. For anti-dwell control monostable stage 12, terminals P1 and P15 provide for connection of external circuitry (described in detail later) whereby the timing characteristic of this stage may be established. For filter amplifier stage 14, terminals P3 and P4 provide connection of external circuitry (to be described) to establish the frequency response filter characteristics of this stage. For ramp generator stage 16, terminals P5 and P6 provide for connection of external circuitry (to be described) to establish the ramp generating characteristics. For frequency sensitive switch stage 18, terminals P9 and P10 provide for connection of external circuitry (to be described) to establish the frequency sensing characteristics of this stage. Terminals P12 and P13 provide for connection of external circuitry (to be described) with sum stage 20 for establishing the gain of this stage.

In the preferred usage of circuit 10 in an electronic spark timing control circuit for an internal combustion engine, anti-dwell control monostable stage 12 provides at terminal P2 an output pulse which is used to fire the spark ignition system. The anti-dwell control monostable stage is triggered internally of circuit 10 via OR gate 26. Briefly, OR gate 26 is capable of triggering anti-dwell control monostable stage 12 by either a trigger signal received at terminal P14 or a Desired Spark Timing signal which is developed by sum amplifier stage 20 at its output (terminal P13) in a manner which will be explained in greater detail later. When the engine is running, the Desired Spark Timing signal will cause the anti-dwell control monostable stage to fire so that spark ignition advance is optimized according to engine operating conditions such as engine speed, engine load, etc. When the engine is being cranked during starting, the trigger signal at terminal P14 will cause the anti-dwell control monostable stage to fire the ignition at a fixed firing angle, for example, at or just slightly in advance of piston top dead center (possibly 10° BTDC). Frequency sensitive switch stage 18 distinguishes between engine cranking and engine running by sensing the frequency of an input trigger signal applied to terminal P7. The frequency sensitive switch stage supplies a logic "one", or "high", signal to input 24a of AND gate 24 when the frequency of the signal at terminal P7 exceeds a predetermined frequency which corresponds to an engine speed above engine cranking speed; this enables the Desired Spark Timing signal to fire the anti-dwell control monostable stage. When the frequency of the trigger signal at terminal P7 drops below this frequency to a speed below engine idle speed, then the frequency sensitive switch stage supplies a logic "zero", or "low", to input 24a of AND gate 24 thereby preventing the Desired Spark Timing signal from firing anti-dwell control monostable stage 12 so that the trigger signal at terminal P14 controls firing. It should be pointed out that in accordance with one feature of the present invention, the application of a trigger signal to terminal P14 will always cause anti-dwell control monostable stage 12 to switch from a stable to an unstable condition thereby firing the ignition system, provided that the monostable is in the stable condition when the effect of the trigger signal applied to terminal P14 is felt by the monostable. As will be more fully appreciated hereinafter in connection with the description of the later drawing figures, this feature enables anti-dwell control monostable stage 12 to fire the ignition system during running of the engine in the unusual event that the Desired Spark Timing signal is unable to fire the ignition in the customary manner.

It may be explained at this juncture that the trigger signals applied to terminals P7 and P14 are derived from pick-up circuitry associated with the engine for providing trigger signals at predetermined angular positions of the engine crankshaft, which as is understood in the art, correspond to given positions of the pistons in the respective cylinders. For example, in an eight cylinder engine, a trigger signal may be given at every 90° of engine crankshaft rotation. As will be seen in the detailed consideration of the ensuing drawing figures, the pick-up circuitry may be of various form including single and dual pick-up types and the engines with which these are used may be four, six, or eight cylinder engines. The trigger signal applied to terminal P14 is customarily referred to as the "start" trigger signal because it is used to fire the spark ignition at a fixed firing angle during cranking of the engine. The other trigger signal applied to terminal P7 is referred to customarily as the "run" trigger signal. The run trigger signal is supplied internally of circuit 10 to both frequency sensitive switch stage 18, as explained above, and also to ramp generator stage 16. The ramp generator is thereby reset at predetermined engine crankshaft angles whereby a sawtooth waveform is produced at the ramp generator output and is supplied to the non-inverting input of comparator 22. The period of the sawtooth waveform supplied by ramp generator 16 to comparator 22 is proportional to the number of engine crankshaft degrees between times that the ramp generator is reset by the run trigger signal and hence corresponds to the number of crankshaft degrees between firings of the spark ignition system, assuming a constant spark advance. (For example, this would be 90° in an eight cylinder engine.) For reasons which will be explained later, the sawtooth waveform has a constant peak-to-peak amplitude which is independent of the frequency at which the ramp generator is being reset and hence is independent of engine speed. Therefore, the magnitude of the sawtooth waveform at any instant of time is representative of a given angular position of the engine crankshaft. The Desired Spark Timing signal supplied by sum amplifier 20 to comparator 22 is an analog signal whose magnitude is representative of the engine crank angle at which spark ignition is desired. This magnitude will vary in accordance with the selected engine operating conditions which are being sensed to develop the desired amount of spark advance. Comparator 22 compares the Desired Spark Timing signal with the sawtooth signal from ramp generator 16. The comparator output signal switches from a logic zero to a logic one when the sawtooth and the Desired Spark Timing signals are equal. So long as AND gate 24 is enabled by a logic one signal at input 24a at the time that the output of comparator 22 switches from a logic zero to a logic one (and assuming that the input at terminal P14 is high), then the output of AND gate 24 switches from a logic zero to a logic one which is coupled through OR gate 26 to fire anti-dwell control monostable 12. Thus, it will be appreciated that during running, the time at which anti-dwell control monostable 12 fires the ignition system is established by the Desired Spark Timing signal. The development of the Desired Spark Timing signal can be in accordance with known techniques to produce the optimum firing angle in accordance with how the engine is being operated at any given instant of time. With this brief introductory description in mind, greater consideration can be focused upon the detail of the individual circuits.

Figure 2:
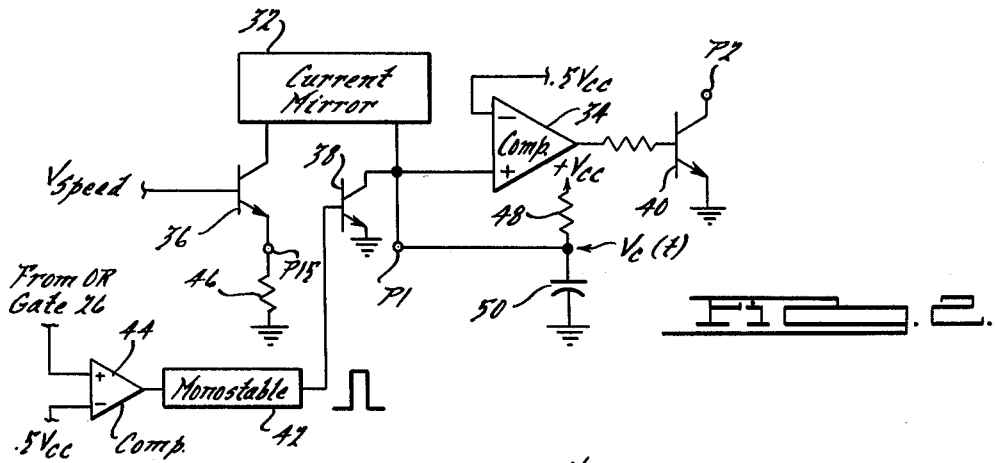
FIG. 2 is an electronic schematic diagram illustrating one of the blocks of FIG. 1 in somewhat greater detail.

FIG. 2 illustrates in greater detail a possible configuration for anti-dwell control monostable stage 12. Stage 12 may comprise a current mirror 32, a comparator 34, three transistors of NPN conductivity type 36, 38, and 40, a monostable 42, and a comparator 44 connected as illustrated. The emitter-collector circuit of transistor 36 connects in the input control branch of current mirror 32 and the emitter-collector of transistor 38 in the controlled output branch. The base of transistor 36 receives a signal $V_{speed}$ from the output of filter amplifier stage 14 and the non-inverting input of comparator 44 receives the trigger signal from the output of OR gate 26. In order to establish desired timing characteristics for the antidwell control monostable stage, external circuitry is connected with terminals P1 and P15 as illustrated. A resistor 46 is connected between ground and the emitter of transistor 36 at terminal P15. An RC series circuit comprising a resistor 48 and a capacitor 50 connects between $+V_{cc}$ and ground with the junction thereof being connected to the collector of transistor 38 at terminal P1. The P2 terminal is at the open collector of transistor 40.

The circuit of FIG. 2 operates as follows. The signal $V_{speed}$ is a voltage whose magnitude is representative of the speed of the engine. (The manner in which the $V_{speed}$ signal is developed will be explained later.) If it is assumed that transistor 38 is not conducting and that capacitor 50 is fully charged to $+V_{cc}$ volts, then current mirror 32 is out of range and no current flows in the output branch. When the output of OR gate 26 switches from a zero to a one, the output of comparator 44 goes high to fire monostable 42. In turn transistor 38 is switched into conduction for the duration of the monostable pulse from monostable 42. The duration of this pulse, and thus conduction of transistor 38, is just long enough to discharge capacitor 50. Accordingly, when this happens the voltage at the non-inverting input of comparator 34 falls to just above ground thereby causing the comparator output to go low and turn off transistor 40. When transistor 38 returns to its non-conducting condition, capacitor 50 immediately commences to recharge through resistor 48 from $+V_{cc}$ and also from current mirror 32. The rate at which capacitor 50 charges is a function of the $V_{speed}$ signal. When the potential across the capacitor rises to a level sufficient to switch comparator 34 back to its original condition, transistor 40 once again turns on. The duration for which transistor 40 was cut off represents the anti-dwell time of the ignition. Transistor 40 remains conducting until the next time that OR gate 26 switches from a zero to a one. The duration for which transistor 40 is conducting represents the dwell time. The following equations describe the circuit operation.

$$V_c(t) = \left[ \frac{R_i(V_{sp} - V_{be})}{R_d} + V_{cc} \right] [1 - e^{(-t/R_iC)}] \quad \text{Eq (1)}$$

$$T = R_iC \ln \left[ \frac{(R_i/R_d)(V_{sp} - V_{be}) + V_{cc}}{(R_i/R_d)(V_{sp} - V_{be}) + V_{cc}/2} \right] \quad \text{Eq (2)}$$

where $V_c(t)$ is the voltage across capacitor 50;
$R_i$ is the resistance of resistor 48;
$V_{sp}$ is the voltage $V_{speed}$;
$V_{be}$ is the base-emitter voltage of transistor 36;
$R_d$ is the resistance of resistor 46; and
C is the capacitance of capacitor 50. Equation (2) holds for $V_{sp}$ greater than $V_{be}$. As can be seen from these equations, the dwell time is variable in accordance with the magnitude of the $V_{speed}$ signal. Accordingly, it will be appreciated that as the speed of the engine increases, the dwell time increases roughly in proportion thereto while there is a corresponding decrease in the anti-dwell time. The purpose of $R_i$ is to set the anti-dwell time before there is any usable speed voltage, i.e. during cranking. Thus, for $V_{sp}$ less than $V_{be}$ the equation reduces to:

$$T = R_iC \ln(2) \quad \text{Eq (3)}$$

It will also be observed that by selection of the RC time constant of resistor 48 and capacitor 50 the dwell and anti-dwell characteristics may be tailored to the requirements of a given engine and its ignition system.

Figure 3:
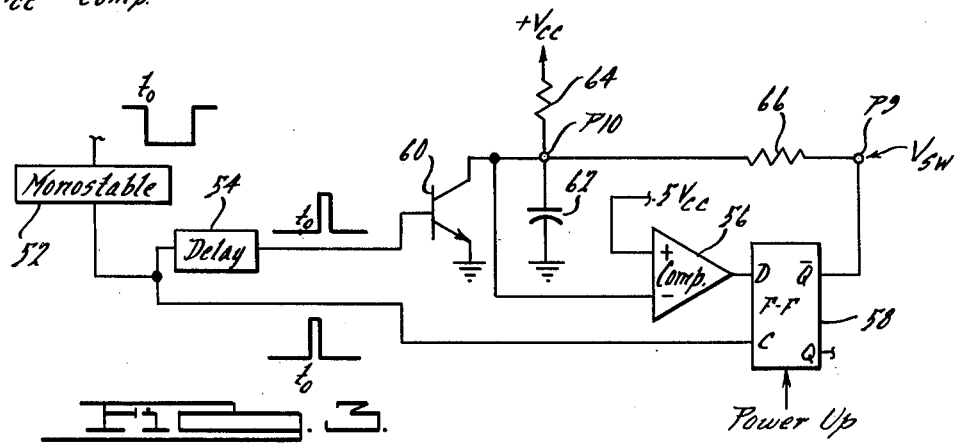
FIG. 3 is an electronic schematic diagram illustrating another of the blocks of FIG. 1 in somewhat greater detail.

FIG. 3 illustrates one possible configuration for frequency sensitive switch stage 18. The circuit of FIG. 3 comprises a monostable 52, a delay circuit 54, a comparator 56, a data flip-flop 58, and a transistor 60 of NPN conductivity type. Also, operatively associated with the circuit are three external devices: a capacitor 62, and a pair of resistors 64, 66 which are connected as illustrated with terminals P9 and P10. Monostable 52 receives the pick-up trigger signal applied to terminal P7 and produces in response to the edge thereof an output pulse which is supplied to the C (clock) input of flip-flop 58. Delay circuit 54 delays slightly this pulse, and the slightly delayed pulse is applied to the base of transistor 60. The delayed pulse holds transistor 60 in conduction just long enough to discharge any charge on capacitor 62 so that a signal of just slightly above ground potential now exists at the inverting input of comparator 56. When the delayed pulse terminates and transistor 60 switches back to a non-conducting condition, capacitor 62 begins to charge through resistor 64 from $+V_{cc}$. The voltage at the $\overline{Q}$ output of flip-flop 58 is coupled through resistor 66 to capacitor 62 so that the rate of charge of capacitor 62 also depends upon the $\overline{Q}$ output voltage and the value of resistor 66. The following equation defines the time required to charge capacitor 62 to $0.5V_{cc}$ which is the voltage required to switch the comparator output from a high to a low.

$$T = RC_1 \ln \left[ \frac{V_{cc}R_h + V_{sw}R_s}{(R_h - R_s)V_{cc}/2 + V_{sw}R_s} \right] \quad \text{Eq (4)}$$

Where $R = R_sR_h/R_s + R_h$;
$R_h$ is the resistance of resistor 66;
$V_{sw}$ is the voltage at $\overline{Q}$ output of flip-flop 58;
$R_s$ is the resistance of resistor 64; and
$C_1$ is the capacitance of capacitor 62.

The circuit is designed so that flip-flop 58 always powers up to produce a logic one at terminal P9 when the ignition switch is actuated to energize the system for starting. Also the circuit is designed so that when the engine is being cranked, the low frequency of the trigger signal received at terminal P7 provides a sufficiently long duration between clockings of flip-flop 58 that capacitor 62 charges to beyond the $0.5V_{cc}$ potential whereby the output signal at the $\overline{Q}$ output of flip-flop 58 remains high (e.g. near $V_{cc}$ potential). Hence, the frequency sensitive switch provides a logic one at terminal P9 during cranking. When the engine begins to run under its own power and accelerate through a speed slightly above cranking speed, the corresponding increase in frequency of the trigger signal at terminal P7 reduces correspondingly the time interval between successive clockings of flip-flop 58 to a point where the output of comparator 56 cannot switch from a high to a low and therefore remains high. When this happens the signal at the $\overline{Q}$ output of flip-flop 58 goes low; the signal at the Q output correspondingly goes high and this latter signal is used to gate AND gate 24 so that the Desired Spark Timing signal can now control ignition firing. When the $\overline{Q}$ signal goes low, the charging current for capacitor 62 is reduced. This introduces a certain hysteresis into the frequency sensing characteristic of stage 18 which is desirable in achieving best operation. The provision of this hysteresis means that a lower frequency of trigger signal is now required to switch the $\overline{Q}$ output signal from low to high than was required to switch it originally from high to low. By selection of circuit component values using standard procedures, the frequency of trigger signal required to switch the $\overline{Q}$ output from low to high may be set to correspond to an engine speed somewhat less than engine idle speed. The benefit of this will be explained in connection with the description of later drawing figures.

Filter amplifier stage 14 and ramp generator stage 16 should be considered together. An external variable resistor is intended to be connected between terminal P5 and ground and an external capacitor between terminal P6 and ground to provide for desired ramp characteristics. The input of ramp generator stage 16 is connected with terminal P7 so that the ramp is reset by the trigger signal supplied to terminal P7 and, thereby, develops the sawtooth output waveform, appearing at terminal P11. External circuitry operatively couples terminals P3, P4, and P11 to provide closed-loop regulation. Stages 14 and 16, and external circuitry perform a function essentially like that shown in U.S. Application, Ser. No. 545,274, filed Jan. 30, 1975, now U.S. Pat. No. 4,102,311, and assigned to the same assignee as the present application. Briefly, the capacitor connected to terminal P6 is charged in such a manner that the peak of the sawtooth is regulated to a constant peak-to-peak amplitude which is independent of the frequency at which the ramp generator is reset by the trigger signal at terminal P7. In this way the magnitude of the ramp at any instant of time is always representative of the instantaneous engine crankshaft position in angular degrees. The feedback connection from terminal P11 to terminal P3 provides the closed-loop regulation for achieving the constant peak-to-peak amplitude of the sawtooth. The external circuitry connected with terminals P3, P4, and P11 determines the frequency response characteristic. Depending on frequency ranges to be covered, either single or two pole filters may be implemented. The single pole has fewer components but the two pole filter has better response vs. ripple characteristics. Filter amplifier 14 develops the $V_{speed}$ signal which is supplied internally to both stages 12 and 16 and which is an analog voltage representing engine speed. The variable resistor connected to terminal P5 is adjusted to secure exact calibration of the signal $V_{speed}$ to the frequency at which the ramp generator is being reset by the trigger signal at terminal P7. This compensates for capacitor tolerance variations.

Figure 4:
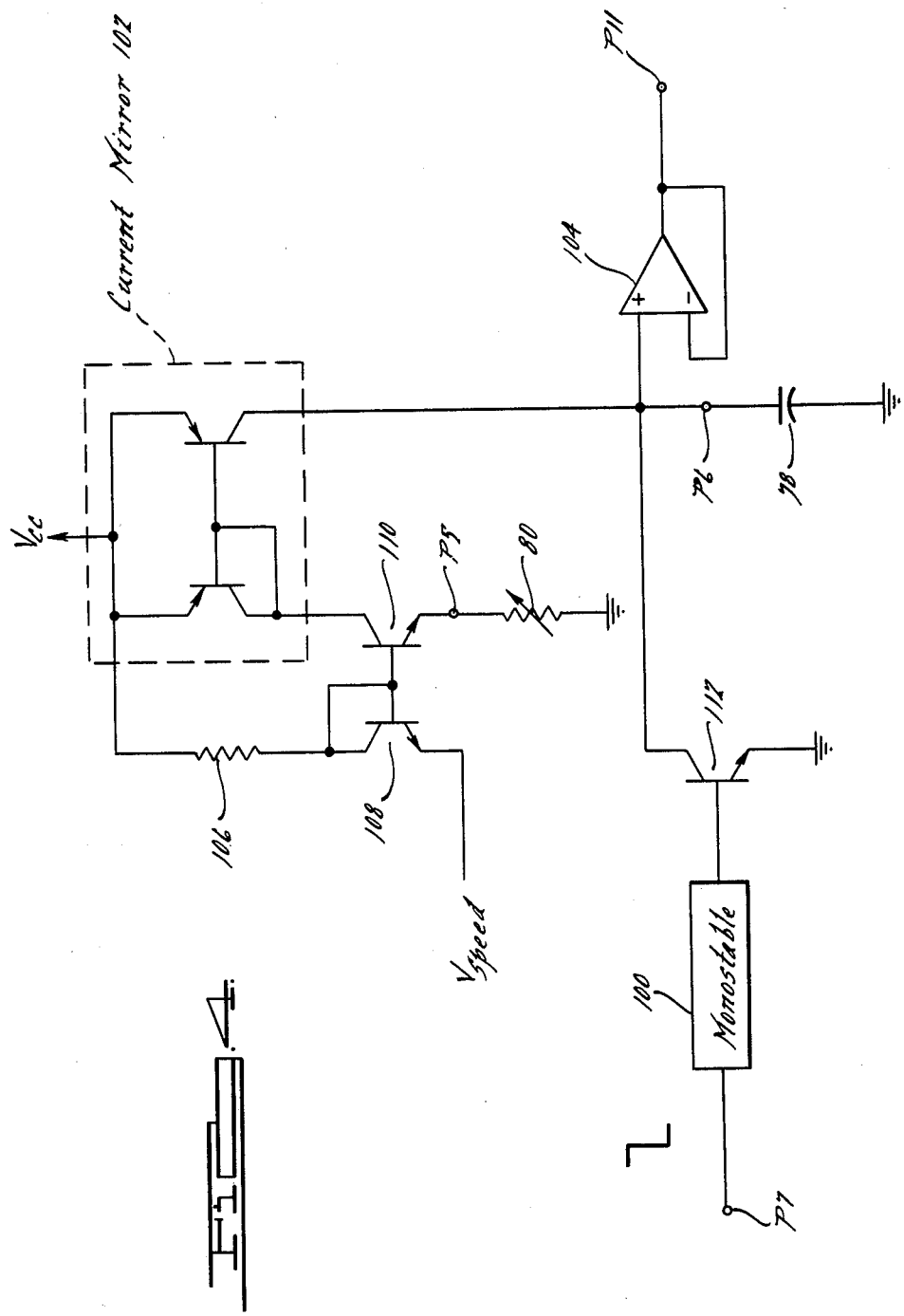
FIG. 4 is an electronic schematic diagram illustrating another of the blocks of FIG. 1 in somewhat greater detail.

FIG. 4 illustrates a possible implementation of ramp generator stage 16. The implementation comprises a monostable circuit 100, a current mirror 102, a buffer amplifier 104, a resistor 106, and three transistors of NPN conductivity type 108, 110, and 112, which are connected as shown. An external capacitor 78 connects between terminal P6 and ground and an external variable resistor 80 connects between terminal P5 and ground. The input of monostable 100 is at terminal P7 to receive the trigger signal supplied to that terminal. The emitter of transistor 108 is connected internally to receive $V_{speed}$ signal from filter amplifier stage 14. The output of the stage is at terminal P11 to which the output terminal of buffer amplifier 104 is connected. In response to each negative-going transition in the trigger signal at terminal P7, monostable 100 provides a short duration output pulse which switches transistor 112 into conduction. The duration of this pulse, and hence of conduction of transistor 112, is just long enough to discharge capacitor 78. When the monostable pulse terminates and transistor 112 returns to a non-conducting condition, capacitor 78 is charged by charging current from current mirror 102. The magnitude of this charging current is determined by the magnitude of the $V_{speed}$ signal and the resistance value of resistor 80. The circuit arrangement is such that the $V_{speed}$ signal is reflected at the emitter of transistor 110. It will be appreciated, therefore, that the magnitude of the collector-emitter current through transistor 110 is directly proportional to the $V_{speed}$ signal and inversely proportional to the resistance value of resistor 80. Current mirror 102 in turn reflects a corresponding magnitude of charging current (i.e. mirrored current) for charging capacitor 78. As the $V_{speed}$ signal increases and decreases, the magnitude of the current through resistor 80 likewise increases and decreases. In turn, capacitor 78 charges more rapidly and more slowly. As will be seen in connection with the description of subsequent drawing figures, the trigger signal at terminal P7 triggers monostable 100 to reset the ramp generator at predetermined engine crank angles. Accordingly, a sawtooth waveform appears at terminals P6 and P11 and has a period equal to 720° ÷ the number of cylinders in the engine for a four stroke internal combustion engine. By virtue of the closed loop arrangement whereby filter amplifier 14 develops the $V_{speed}$ signal, the amount of charging current for capacitor 78 increases as the engine speed increases and decreases as the engine speed decreases. Resistor 80 provides for calibration of the $V_{speed}$ signal in the following manner. If it is assumed that monostable 100 is being triggered at a constant triggering frequency, the ramp voltage at terminal P11 will have a constant slope as a function of time for a given setting of resistor 80. If resistor 80 is increased in magnitude, a smaller magnitude of charging current is supplied from current mirror 102 to charge capacitor 78. This means that the slope of the ramp decreases. Correspondingly, if the resistance of resistor 80 decreases, capacitor 78 charges more rapidly and the ramp has a larger slope. Because of the feedback loop closure whereby the sawtooth waveform is regulated to a constant peak-to-peak magnitude, adjustment of resistor 80 will secure an adjustment of the $V_{speed}$ signal while no affect on the peak-to-peak regulation of the sawtooth obtains. Thus it is in this manner that adjustable resistor 80 is advantageous in securing precise calibration of the $V_{speed}$ signal.

Figure 5:
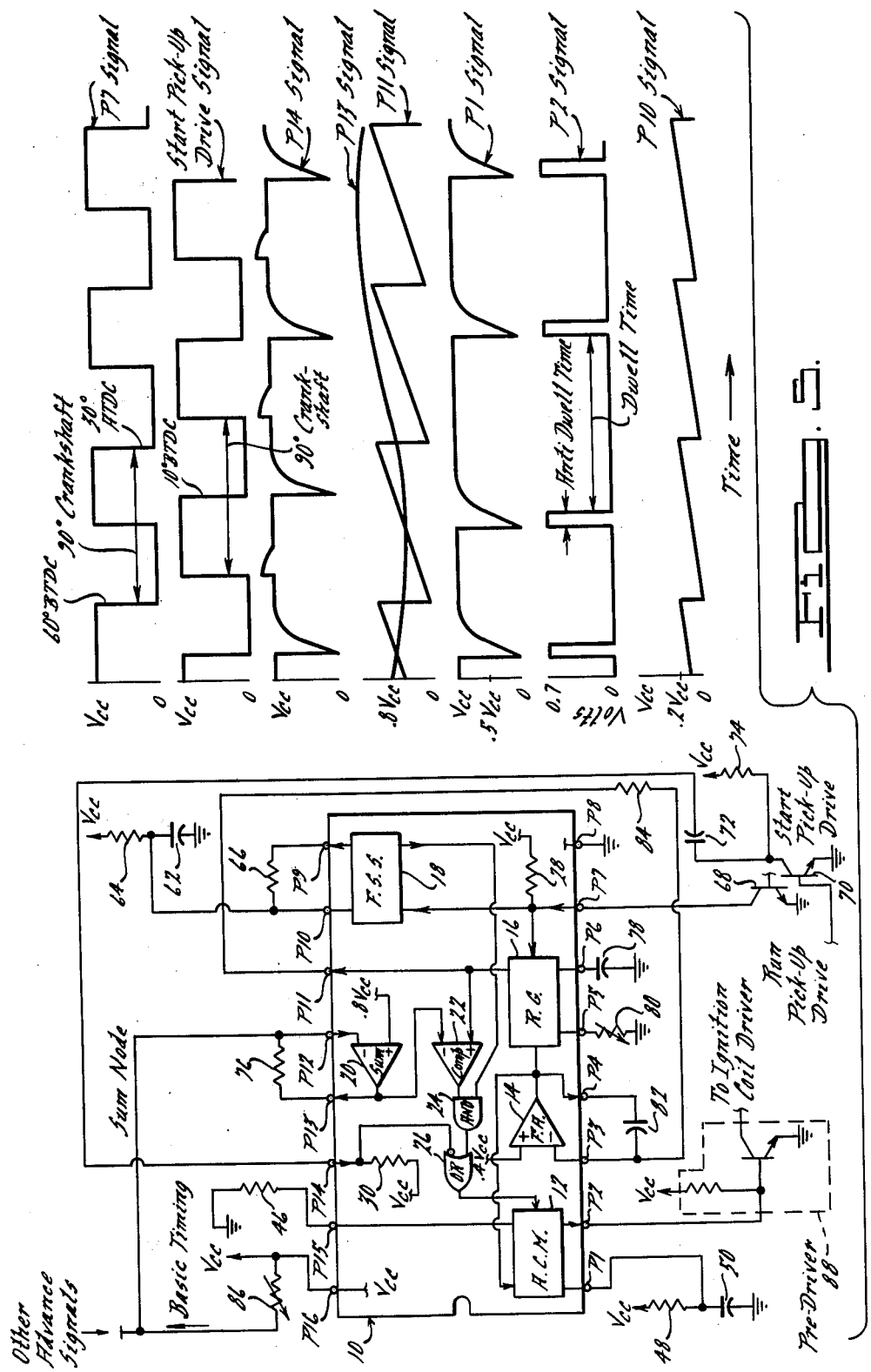
FIG. 5 is an electronic schematic diagram of the circuit of FIG. 1 connected in a first type of electronic engine control system and includes a plurality of signal waveforms at selected points of the system which are useful in illustrating the system operation.

FIG. 5 illustrates an electronic spark timing system utilizing circuit 10. The system is a dual pick-up type having separate start and run pick-ups and is illustrated by way of example for an eight cylinder engine. The pick-ups may be conventional type devices arranged to provide trigger signals at predetermined crankshaft rotational positions. For example, the run pick-up can supply a signal via a run pick-up drive transistor 68 whereby the illustrated P7 square wave (i.e. 50% duty cycle) signal waveform is applied to terminal P7. The start pick-up supplies a signal via a start pick-up drive transistor 70 whereby the signal designated in the drawing as the start pick-up drive signal (also a 50% duty cycle signal) is developed at the collector of transistor 70. The collector of transistor 70 is pulled up to $+V_{cc}$ by a resistor 74, and the start pick-up drive signal is coupled through a coupling capacitor 72 to terminal P14. The signal designated as P14 signal is at terminal P14 and is in the form of pulses, or spikes, at 90° intervals. The P11 signal waveform shown in the drawing is the sawtooth waveform developed at terminal P11 by the ramp generator stage 16. As one can see from comparison with the P7 signal, the P11 signal is reset to approximately zero in response to each transition of the P7 signal from $+10$ volts ($V_{cc}$) to approximately zero volts (ground). In addition to those external components previously described and identified by like numerals, there are provided a resistor 76 connected between terminals P13 and P12, a capacitor 82 connected between terminals P3 and P4, and a resistor 84 connecting terminal P11 to terminal P3. Resistor 76 is selected to provide a desired gain for sum amplifier 20. Capacitor 82 and resistor 84 are selected to provide the desired frequency response characteristic of the feedback loop regulation of the sawtooth peak-to-peak magnitude. Terminal P12 is a summing node, or junction, for the spark timing signals. Basic timing may be established by an adjustable resistor 86 connected from $+V_{cc}$ to the summing junction. Terminal P2 connects to a pre-driver stage 88 which in turn leads to an ignition coil driver stage (not shown) and the ignition coil (not shown) for firing the ignition system. The waveforms illustrate an operating condition where the engine speed is sufficiently high that frequency sensitive switch 18 is supplying a signal to AND gate 24 whereby the anti-dwell control monostable is fired in accordance with the Desired Spark Timing signal. This is shown for the first two firings where the P13 signal, which is the Desired Spark Timing signal, intercepts the reference sawtooth signal, which is the P11 signal. The third firing, however, is accomplished by the start pick-up drive signal instead of the Desired Spark Timing signal because the P13 signal has abruptly changed to a condition where it does not intercept the P11 signal. It should be appreciated that the illustrated waveforms are merely for explanation of the operation and do not necessarily represent actual waveforms in an operational system. With the illustrated example, the start pick-up drive signal is designed to fire the ignition at a piston position 10 degrees before top dead center (BTDC). By designing the various input circuits from which the Desired Spark Timing signal is developed such that there is obtained a possible firing range by the Desired Spark Timing signal in advance of 10 degrees BTDC (for example, 35–10 degrees BTDC), optimum spark advance is established within this range when the Desired Spark Timing signal is controlling firing; yet in the event of a transient condition or a failure wherein the Desired Spark Timing signal fails to fire the ignition system in this advance range before 10 degrees BTDC, then the start pick-up drive will fire the ignition system at the 10 degree BTDC position. With this arrangement the combustible charge in the cylinder is always ignited even though perhaps not at the time that it otherwise would by the Desired Spark Timing Signal. However such firing by the start drive signal will occur only under unusual transient conditions or in a failure of the circuitry associated with the Desired Spark Timing signal. By designing the system such that the start pick-up signal is located in an angular position to fire the ignition system during cranking and starting of the engine, the start pick-up fires the ignition during cranking and starting. Once the engine catches, the engine will accelerate to a speed which is sensed by frequency sensitive switch 18 to cause control of ignition firing to transfer from the start pick-up drive to the Desired Spark Timing Signal. Therefore, in summary, it may be said that during normal operation of the running engine, the Desired Spark Timing signal controls the time of spark ignition to the exclusion of the start pick-up drive signal. However, should an unusual transient condition or failure occur where the P13 signal does not intercept the P11 signal prior to the piston in the cylinder which is to be fired reaching the 10 degree BTDC position, then the start pick-up will cause the ignition system to fire at this position. The hysteresis imparted to the frequency sensitive switch by resistor 66 provides for a "limp-in" capability whereby if there is a failure in the run pick-up or associated drive whereby an engine speed of less than engine idle speed is sensed (even though the engine is still running), the engine continues to be fired by the start pick-up at the fixed 10° BTDC angle. This enables the vehicle to still be driven although typically with deteriorated driveability and performance.

Figure 6:
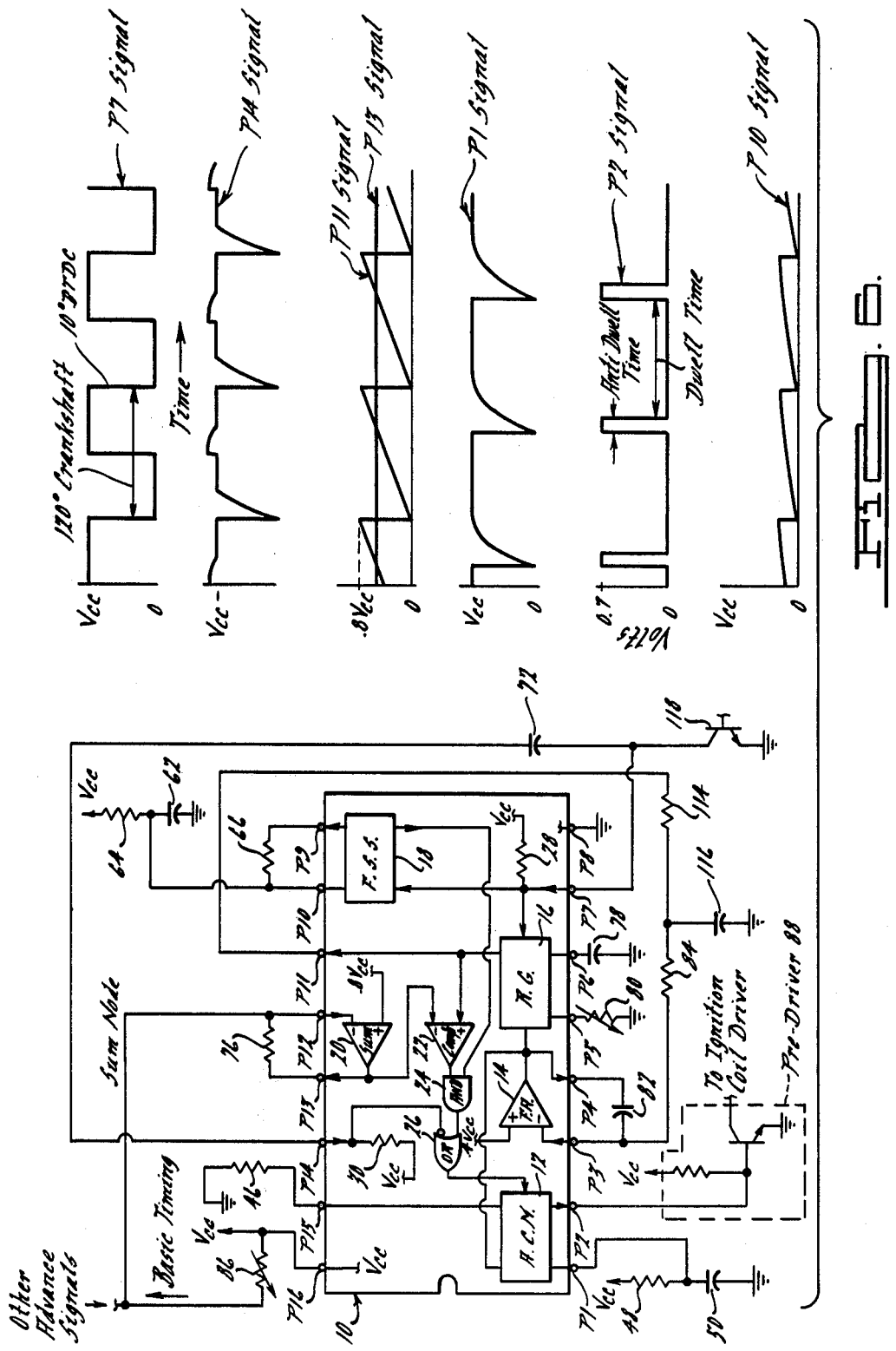
FIG. 6 is an electronic schematic diagram of the circuit of FIG. 1 connected in a second type of electronic engine control system and includes a plurality of signal waveforms at selected points of the system which are useful in explaining system operation.

FIG. 6 illustrates an electronic spark timing control system containing circuit 10. The system is very similar to the system of FIG. 5 and like components are designated by like numerals in the two views. The system of FIG. 6 differs from that of FIG. 5 in that the FIG. 6 system is illustrated for a six cylinder engine and utilizes only a single pick-up rather than the dual pick-up system of FIG. 5. The single pick-up system may be a Hall-type device which includes an output drive transistor 118 whose collector connects both directly to terminal P7 and also through capacitor 72 to terminal P14. Transistor 118 switches into and out of conduction according to engine crankshaft position as sensed by the single pick-up to develop the P7 signal waveform illustrated in the drawing which appears at the collector or transistor 118. This signal is coupled through capacitor 72 so that the illustrated waveform identified as the P14 signal in the drawing is developed at terminal P14. The only other difference between the systems of FIGS. 5 and 6 is that in FIG. 6 an additional filter consisting of a resistor 114 and a capacitor 116 is connected in the feedback loop from terminal P11 to terminals P3 and P4 whereby an additional pole is provided in the transfer function which is beneficial in improving the frequency response. The waveforms of FIG. 6 illustrate the manner of the spark timing control. When the engine is running under normal conditions, the Desired Spark Timing signal, which is the P13 signal, controls the time of spark firing. Each time that the sawtooth waveform P11 signal intercepts the level of the P13 Desired Spark Timing signal, anti-dwell control monostable stage 12 is fired to provide the P2 signal output pulse which fires the ignition. As the Desired Spark Timing signal varies in magnitude, the time of spark firing is similarly varied. The reader will observe that the P7 signal waveform is phased in relation to the engine crankshaft angular position such that the trailing edge of each positive-going pulse of the P7 signal occurs at the 10° BTDC position. Because this trailing edge is utilized to develop the trigger signal pulse applied to terminal P14, the reader will further recognize that the start trigger signal pulse (i.e. P14 waveform spike) is also given at the 10° BTDC position. If for any reason the Desired Spark Timing signal, during running of the engine, failed to fire the anti-dwell control monostable stage, then the P14 trigger signal pulse will be directly coupled via OR gate 26 to fire the anti-dwell control monostable stage at the 10°

BTDC position. During cranking of the engine, the P14 signal also fires the ignition. In all other respects the operation of the system of FIG. 6 is like that of the FIG. 5 system. It should be pointed out that the single pick-up configuration of FIG. 6 can be utilized with engines than six cylinder engines with appropriate phasing of the single pick-up signal in relation to engine crankshaft position.

FIG. 7 illustrates a third example of an engine spark timing control system utilizing circuit 10. The FIG. 7 system is a four cylinder engine having a single pick-up. The FIG. 7 system incorporates a "blanking" feature whereby alternate pulses of the sawtooth waveform at P11 are blanked to achieve the required 180° interval between ignition firing which is required for a four cylinder engine. In order to accomplish this, external circuitry associated with the single pick-up is operatively coupled with the two trigger input terminals P7 and P14. This circuitry comprises three transistors 120, 122, 124 of NPN conductivity type, a pair of capacitors 126, 128, a pair of diodes 130a and 130b, and resistors 132, 134a, 134b, 136, 138, and 139. These circuit components are connected as illustrated in FIG. 7. In operation, a square wave signal from the pick-up device is applied to the base of transistor 124. This signal is similar to the P14 signal illustrated in the drawing with the exception that it is 180° out of phase with respect thereto. Transistors 122 and 124 are interconnected with each other such that when one is conducting, the other is non-conducting, and vice versa. Therefore, when transistor 124 is non-conducting, transistor 122 is conducting and the signal at terminal P14 is high. When transistor 124 is conducting, transistor 122 is non-conducting and the signal at terminal P14 is high. Capacitors 126 and 128 provide respective connections from the collectors of transistors, 124, 122 through the respective diodes 130a, 130b to the emitter of transistor 120. Each time that either of the two transistors 124, 122 switches from a non-conducting to a conducting condition, the reduction in the collector voltage of that transistor is coupled through the corresponding capacitor and diode to cause transistor 120 to briefly switch into conduction. In turn, a reset pulse is supplied to terminal P7 as illustrated by the waveform designated P7 signal in FIG. 7 wherein the pulse width is somewhat exaggerated for illustrative purposes. With this arrangement, it will be appreciated that the ramp generator is being reset at 90° intervals of engine crankshaft rotation although the pickup has a period of 180° crankshaft rotation. Each diode 130a, 130b is provided for zener protection of transistor 120. Resistors 132 and 134a cooperate to provide a forward bias for diode 130a, and resistors 132 and 134b do likewise for diode 130b. Because comparator 22 always compares the sawtooth voltage output of ramp generator 16 with the Desired Spark Timing signal, the comparator will provide at its output an ignition firing signal every 90° of engine crankshaft rotation. However, this is where the "blanking" feature comes into play. The blanking feature is provided by the signal at terminal P14. Because the P14 signal is high on alternate periods of the sawtooth waveform, the output signal of OR gate 26 is forced high during the alternate periods of the sawtooth waveform which are coincident with the P14 signal being high. With this arrangement it is impossible for comparator 22 to fire the anti-dwell control monostable stage during these alternate periods even though triggering of the monostable stage would otherwise occur because of the 90° sawtooth period. Therefore, when the engine is running, the Desired Spark Timing signal actually causes firing of the ignition system only on alternate periods of the sawtooth waveform wherein the P14 signal is concurrently low. When the engine is being cranked during starting, the P14 signal will trigger the anti-dwell control monostable stage at 180° intervals and because of the arrangement of circuit 10, firing by the Desired Spark Timing signal during cranking is precluded. Therefore it is desirable to phase the trigger signal such that the trailing edge of each negative-going pulse of the P14 signal, which causes these firings, is in a range somewhat before top dead center for example, at 10° BTDC.

The blanking feature: allows for better frequency response since twice as much information is supplied to the speed filter; limits advance range to 90° (it is not desirable to have more than 90° range anyway); and gives greater resolution since the ramp has twice as many volts per degree as it would have without blanking.

By providing terminals P13 and P12, as explained above, the value of resistor 76 may be selected to establish the gain of the sum amplifier stage. This calibrates the amount of spark advance for the various inputs from which the advance is derived. It is also possible to provide temperature compensation of the Desired Timing Signal by connecting a temperature responsive device such as a thermistor, with the sum amplifier stage. One way of doing this is by connecting a thermistor between terminals P12 and P13, preferably in series with a resistor to make the stage gain vs. temperature curve more linear. The thermistor is suitably disposed to monitor temperature and serves to attenuate the gain as temperature increases so as to alleviate possible detonation problems. When using this temperature compensation technique, a further advantage, useful for calibrating the temperature compensation characteristic, results from connecting the non-inverting input of sum amplifier 20 to the same potential as the peak of the sawtooth (i.e., 0.8 $V_{cc}$). By so connecting the non-inverting input, the potential at the inverting input is forced to essentially the same potential (i.e., 0.8 $V_{cc}$). Now if the Desired Spark Timing signal is adjusted so that ignition occurs at the peak of the sawtooth, the potential at the output of sum amplifier 20 is 0.8 $V_{cc}$. Resistor 86 may now be adjusted to set the basic timing without regard to actual temperature since there is no current flow through the thermistor. This simplifies the calibration procedure. There is also the advantage that the basic timing is independent of the ambient temperature.

In the foregoing description there have been disclosed a novel electronic circuit and systems containing said circuit which offer advantages not previously attainable in electronic engine controls. Reliability, versatility, and economy improvements are obtained which promote mass-production usage in commercial products to the benefit of the consumer and the public. This invention indeed marks a milepost in electronic engine controls.

What is claimed is:

1. An electronic timing control circuit comprising:
   an output stage which is switched from one state to another state to produce an output signal;
   an output terminal connected with said output stage at which said output signal is given;
   a first input terminal receiving a variable frequency trigger signal;

a second input terminal receiving a variable frequency trigger signal;

a third input terminal receiving a desired timing signal representing desired timing of said output signal; and circuit means coupling said three input terminals and said output stage such that each occurrence of the trigger signal at said first input terminal always causes said output stage to produce said output signal so long as said output stage is in its one state at the time that the effect of that trigger signal's occurrence is felt by said output stage, and when the frequency of the trigger signal received at said second input terminal exceeds a selected frequency, the desired timing signal received at said third input terminal controls, at least in part, the time at which said output stage produces said output signal; and utilization means connected with said output terminal for utilizing said output signal;

wherein said circuit means comprises a frequency sensitive switch circuit having an input coupled to said second input terminal and having an output;

said frequency sensitive switch circuit comprising means providing at the output thereof a logic signal having a first logic level when the frequency of said second-mentioned variable frequency trigger signal is below said selected frequency and a second logic level when the frequency of said second-mentioned trigger signal exceeds said selected frequency;

said circuit means including logic circuit means having three inputs and an output, means connecting the first of said three inputs to the output of said frequency sensitive switch circuit, means connecting the second of said three inputs to said first input terminal, means connecting the third of said three inputs to said third input terminal, and means connecting the output of said logic circuit means to said output stage;

said logic circuit means comprising means for enabling said desired timing signal to control, at least in part, the time at which said output stage produces said output signal when the logic signal at the output of said frequency sensitive switch circuit is at its second logic level, means for preventing said desired timing signal from controlling the time at which said output stage produces said output signal when the logic signal at the output of said frequency sensitive switch circuit is at its first logic level, said logic circuit means comprising means for permitting each occurrence of said first-mentioned trigger signal to always cause said output stage to produce said output signal so long as said output stage is in its one state at the time that the effect of that trigger signal's occurrence is transmitted through said logic circuit means to said output stage.

2. An electronic timing control circuit as claimed in claim 1 wherein said logic circuit means comprises a first logic gate having a pair of inputs one of which corresponds to the first one of said three inputs of said logic circuit means and the other of which corresponds to the third of said three inputs of said logic circuit means, said first logic gate also having an output, said logic circuit means also comprising a second logic gate having a pair of inputs one of which corresponds to the second of said three inputs of said logic circuit means, said second logic gate also having an output, means connecting the other input of said second logic gate to the output of said first logic gate, the output of said second logic gate corresponding to the output of said logic circuit means.

3. An electronic timing control circuit as claimed in claim 2 wherein said first logic gate comprises an AND logic gate and said second logic gate comprises an OR logic gate having an inverting input terminal as said one input thereof which corresponds to the second of said three inputs of said logic circuit means.

4. An electronic timing control circuit as claimed in claim 1 wherein said frequency sensitive switch circuit comprises means endowing same with hysteresis in its switching characteristic between said first and second logic levels as a function of the frequency of said second-mentioned variable frequency trigger signal.

5. An electronic timing control circuit comprising:

an output stage which is switched from one state to another state to produce an output signal;

an output terminal connected with said output stage at which said output signal is given;

a first input terminal receiving a variable frequency trigger signal;

a second input terminal receiving a variable frequency trigger signal;

a third input terminal receiving a desired timing signal representing desired timing of said output signal; and circuit means coupling said three input terminals and said output stage such that each occurrence of the trigger signal at said first input terminal always causes said output stage to produce said output signal so long as said output stage is in its one state at the time that the effect of that trigger signal's occurrence is felt by said output stage, and when the frequency of the trigger signal received at said second input terminal exceeds a selected frequency, the desired timing signal received at said third input terminal controls, at least in part, the time at which said output stage produces said output signal; and utilization means connected with said output terminal for utilizing said output signal;

wherein said circuit means comprises means for generating a reference sawtooth waveform comprising a ramp generator having an input connected to said second input terminal and having an output at which said reference sawtooth waveform is given, said ramp generator being reset by said second-mentioned variable frequency trigger signal whereby said sawtooth waveform is generated;

a comparator circuit having a pair of inputs and an output, means connecting the output of said ramp generator with one of said comparator inputs, means coupling the other comparator input to said third input terminal, said comparator circuit comparing said reference sawtooth waveform and said desired timing signal to provide a comparator output signal at the comparator circuit output each time that a predetermined relationship between said sawtooth waveform and said desired timing signal is attained; and means coupling the output of said comparator circuit, said first and second input terminals, and said output stage such that each occurrence of the trigger signal at said first input terminal always causes said output stage to produce its output signal so long as said output stage is in its one state at the time that the effect of that trigger signal's occurrence is felt by said output stage, and when the frequency of the trigger signal received at said second input terminal exceeds said selected frequency, the comparator output signal causes said output stage to produce its output signal so long as said output stage is in its one state at the time that the effect of the comparator output signal is felt by said output stage.

6. In an electronic timing control circuit the subcombination comprising:

first and second terminals adapted to be connected with a DC power supply for energizing circuitry of the subcombination;

an output stage which is switchable from one state to another state to produce at an output thereof an output signal;

a third terminal connected with said output of said output stage and at which output signal is given;

a fourth terminal adapted to receive a variable frequency trigger signal;

a fifth terminal adapted to receive a variable frequency trigger signal;

a sixth terminal adapted to receive a desired timing signal representing desired timing of said output signal;

circuit means coupling said fourth, fifth, and sixth terminals and said output stage such that when a trigger signal is received at said fourth terminal said output stage will produce said output signal in response thereto so long as said output stage is in its one state at the time that the effect of the trigger signal received at said fourth terminal is felt by said output stage, and when a trigger signal is received at said fifth terminal at a frequency greater than a selected frequency, a desired timing signal received at said sixth input terminal will control, at least in part, the time at which said output stage produces said output signal;

at least one additional terminal associated with said output stage adapted to be connected with at least one circuit device external to the circuitry of the subcombination for imparting a desired characteristic to said output stage; and at least one further terminal associated with said means adapted to be connected with a further at least one circuit device external to the circuitry of the subcombination for imparting a desired characteristic to said means.

7. In an electronic timing control circuit, the subcombination as claimed in claim 6 wherein said circuit means comprises a frequency sensitive switch circuit having an input coupled to said fifth input terminal and having an output;

said frequency sensitive switch circuit comprising means providing at the output thereof a logic signal have a first logic level when the frequency of said second-mentioned variable frequency trigger signal is below said selected frequency and a second logic level when the frequency of said second-mentioned trigger signal exceeds said selected frequency;

said circuit means including logic circuit means having three inputs and an output, means connecting the first of said three inputs to the output of said frequency sensitive switch circuit, means connecting the second of said three inputs to said fourth input terminal, means connecting the third of said three inputs to said sixth input terminal, and means connecting the output of said logic circuit means to said output stage;

said logic circuit means comprising means for enabling said desired timing signal to control, at least in part, the time at which said output stage produces said output signal when the logic signal at the output of said frequency sensitive switch circuit is at its second logic level, means for preventing said desired timing signal from controlling the time at which said output stage produces said output signal when the logic signal at the output of said frequency sensitive switch circuit is at its first logic level, said logic circuit means comprising means for permitting each occurrence of said first-mentioned trigger signal to always cause said output stage to produce said output signal so long as said output stage is in its one state at the time that the effect of that trigger signal's occurrence is transmitted through said logic circuit means to said output stage.

8. In an electronic timing control circuit the subcombination as claimed in claim 7 wherein said logic circuit means comprises a first logic gate having a pair of inputs one of which corresponds to the first one of said three inputs of said logic circuit means and the other of which corresponds to the third of said three inputs of said logic circuit means, said first logic gate also having an output, said logic circuit means also comprising a second logic gate having a pair of inputs one of which corresponds to the second of said three inputs of said logic circuit means, said second logic gate also having an output, means connecting the other input of said second logic gate to the output of said first logic gate, the output of said second logic gate corresponding to the output of said logic circuit means.

9. An electronic circuit device adapted for fabrication as a solid state microcircuit device comprising:

sixteen terminals via which the device may be connected in an operative system;

the first and second of said sixteen terminals providing for connection of the device with a DC source of energizing potential for energizing the device;

the third of said sixteen terminals providing for connection to a variable frequency trigger signal source;

the fourth of said sixteen terminals providing for connection to a variable frequency trigger signal source;

the fifth of said sixteen terminals providing for connection to a desired timing signal source;

a monostable output stage having an output and adapted to provide at said output an output signal, the sixth, seventh, and eighth of said sixteen terminals being associated with said monostable output stage, said sixth and seventh terminals providing for connection of external circuitry to endow the monostable output stage with a desired characteristic, said eighth terminal being connected to the output of said monostable output stage, said monostable output stage also having a triggering input;

a frequency sensitive switch stage having an input and an output, the ninth and tenth of said sixteen terminals being associated with said frequency sensitive switch stage and providing for connection of external circuitry to said frequency sensitive switch stage to endow same with a desired characteristic, said frequency sensitive switch stage having the input thereof coupled to said fourth terminal and adapted to provide at the output thereof a logic signal having a first level when the frequency of a trigger signal received at said fourth terminal exceeds a selected frequency and a second level when the frequency of same is below said selected frequency;

a first amplifier stage having an input and an output, the fifth and eleventh of said sixteen terminals being associated with said first amplifier stage, said fifth terminal being connected to the input of said first amplifier stage, and said eleventh terminal being connected to the output thereof;

a ramp generator stage having a reset input, a regulating input and an output, the fourth, twelfth, thirteenth, and fourteenth of said sixteen terminals being associated with said ramp generator stage, said fourth terminal being connected to said ramp generator input, said twelfth and thirteenth terminals providing for connection of external circuitry to said ramp generator stage for endowing same with a desired characteristic, said ramp generator adapted to develop at the output thereof a sawtooth waveform at the frequency of the signal received at said fourth terminal;

a second amplifier stage having an input and an output, the fifteenth and sixteenth of said terminals being associated with said second amplifier stage, said fifteenth terminal being connected to the input of said second amplifier stage and said sixteenth terminal to the output thereof, the output of said second amplifier stage also being connected to said regulating input of said ramp generator stage, said second amplifier stage adapted to provide regulation of the sawtooth waveform produced by said ramp generator stage;

a comparator circuit having a pair of inputs and an output, one of said comparator circuit inputs being connected to the output of said first amplifier stage, the other of said comparator circuit inputs being connected to the output of said ramp generator stage, said comparator circuit adapted to compare the desired timing signal received at said fifth terminal with said sawtooth waveform and provide a comparator output signal at the output thereof each time that a predetermined relationship between said sawtooth waveform and said desired timing signal is attained;

and logic circuit means having three inputs and an output, the first of said inputs of said logic circuit means being connected to the output of said frequency sensitive switch stage, the second of said three inputs of said logic circuit means being connected to the output of said comparator circuit, the third of said three inputs of said logic circuit means being connected to said third terminal, and the output of said logic circuit means being connected to the triggering input of said monostable output stage, said logic circuit means adapted to cause said monostable output stage to produce an output signal at said eighth terminal in response to each occurrence of a trigger signal at said third terminal so long as said monostable output stage is in its reset condition at the time that the effect of that trigger signal's occurrence is felt by said monostable output stage and when said frequency sensitive switch stage senses that the frequency of a trigger signal received at said second input terminal exceeds said selected frequency, a desired timing signal received at said fifth terminal controls, at least in part, the time at which said monostable output stage produces its output signal.

* * * * *